United States Patent
Kwon (10) Patent No.: US 11,589,140 B2
(45) Date of Patent: Feb. 21, 2023

(54) OPTICAL BEAMFORMING DEVICE USING PHASED ARRAY ANTENNA AND OPERATING METHOD THEREOF

(71) Applicant: ELECTRONICS AND TELECOMMUNICATIONS RESEARCH INSTITUTE, Daejeon (KR)

(72) Inventor: Oh Kee Kwon, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 3 days.

(21) Appl. No.: 17/338,911

(22) Filed: Jun. 4, 2021

(65) Prior Publication Data
US 2021/0385561 A1 Dec. 9, 2021

(30) Foreign Application Priority Data

Jun. 8, 2020 (KR) .................. 10-2020-0069215
May 3, 2021 (KR) .................. 10-2021-0057275

(51) Int. Cl.
*H04J 14/00* (2006.01)
*H04Q 11/00* (2006.01)
(Continued)

(52) U.S. Cl.
CPC .......... *H04Q 11/0005* (2013.01); *H01Q 3/30* (2013.01); *H04B 10/5561* (2013.01);
(Continued)

(58) Field of Classification Search
CPC ....... H04Q 11/0005; H04Q 2011/0015; H04Q 2011/0033; H01Q 3/30; H04B 10/5561; H04B 2210/006; H04B 2210/516
See application file for complete search history.

(56) References Cited

U.S. PATENT DOCUMENTS 6,320,539 B1 * 11/2001 Matthews ............ H01Q 3/2682
342/375
6,768,458 B1 * 7/2004 Green ...................... H01Q 3/26
342/158
(Continued)

FOREIGN PATENT DOCUMENTS

KR 1020170070816 A 6/2017
KR 1020180039948 A 4/2018

OTHER PUBLICATIONS

Christos Tsokos et al, "Optical Beamforming Network for Multi-Beam Operation With Continuous Angle Selection," IEEE Photonic Technol. Lett., vol. 31, No. 2, Jan. 15, 2019.
(Continued)

*Primary Examiner* — Pranesh K Barua
(74) *Attorney, Agent, or Firm* — Rabin & Berdo, P.C.

(57) ABSTRACT

An optical beamforming device includes an RF front-end transmitting or receiving RF signals and an optical beamformer forming or compensating for a time delay for each of the plurality of channels based on the RF signals. The optical beamformer includes E/O converters converting the RF signals into optical signals, respectively, a linear modulator generating an optical modulation signal based on an RF input signal, a TTD array outputting an optical combined signal obtained by compensating for a time delay degree of the input optical signals or outputting output optical signals, in each of which a time delay is formed for each channel, by distributing the optical modulation signal, a photo detector generating an RF output signal to an RF back-end based on the optical combined signal, and O/E converters converting the output optical signals into RF signals, respectively.

11 Claims, 8 Drawing Sheets

(51) Int. Cl.
*H01Q 3/30* (2006.01)
*H04B 10/556* (2013.01)

(52) U.S. Cl.
CPC .. *H04B 2210/006* (2013.01); *H04B 2210/516* (2013.01); *H04Q 2011/0015* (2013.01); *H04Q 2011/0033* (2013.01)

(56) References Cited

U.S. PATENT DOCUMENTS

| | | | |
|---|---|---|---|
| 6,782,210 B1* | 8/2004 | Okada | H04Q 11/0005 398/31 |
| 7,729,572 B1 | 6/2010 | Pepper et al. | |
| 9,525,205 B2 | 12/2016 | Oh et al. | |
| 9,740,079 B1* | 8/2017 | Davids | G02B 6/1347 |
| 9,935,367 B2 | 4/2018 | Tiebout et al. | |
| 10,211,902 B1* | 2/2019 | Iannotti | H04B 7/0671 |
| 2010/0103900 A1 | 4/2010 | Yeh et al. | |
| 2011/0280587 A1* | 11/2011 | Xie | H04B 10/2569 398/202 |
| 2016/0126628 A1* | 5/2016 | McGeehan | H01Q 3/2682 342/14 |
| 2018/0102847 A1* | 4/2018 | Kim | G02F 1/025 |
| 2019/0020109 A1* | 1/2019 | Puleri | H01Q 3/2676 |
| 2019/0267708 A1* | 8/2019 | Tennant | H04B 10/505 |

OTHER PUBLICATIONS

L. Zhang et al, "Photonic true time delay beamforming technique with ultra-fast beam scanning," Optics Express, vol. 25, No. 13, Jun. 26, 2017.

L. Zhuang et al, "Single-Chip Ring Resonator-Based 1×8 Optical Beam Forming Network in CMOS-Compatible Waveguide Technology," IEEE Photonics Technology Letters, vol. 19, No. 15, Aug. 1, 2007.

\* cited by examiner

OPTICAL BEAMFORMING DEVICE USING PHASED ARRAY ANTENNA AND OPERATING METHOD THEREOF

CROSS-REFERENCE TO RELATED APPLICATIONS

This application claims priority under 35 U.S.C. § 119 to Korean Patent Application No. 10-2020-0069215 filed on Jun. 8, 2020, and Korean Patent Application No. 10-2021-0057275 filed on May 3, 2021, in the Korean Intellectual Property Office, the disclosures of which are incorporated by reference herein in their entireties.

BACKGROUND

Embodiments of the present disclosure described herein relate to an optical beamforming device and an operating method thereof, and more particularly, relate to an optical beamforming device using a phased array antenna that forms or compensates for a time delay for each channel in a true time delay (TTD) scheme, and an operating method thereof.

In a 5G+ wireless communication technology that has been recently developed, a phased array antenna is being actively studied to expand super-band, ultra-low delay, and super-connectivity. The phased array antenna refers to an antenna capable of scanning a beam in various directions by electrically controlling a phase difference between a plurality of antennas. Beamforming to beamshaping means a function of electrically controlling a phase difference by forming or shaping a wavefront of a beam. The beamformer or beamshaper that performs a beamforming or beamshaping function may scan a direction of the beam quickly and stably, and thus has been used for communication and military radar. Nowadays, the beamformer or beamshaper are being used for smart antennas.

A method of implementing the beamforming function may be divided into a phase shifting (PS) scheme and a true time delay (TTD) scheme. Because beam squint occurs due to dispersion features changed depending on a frequency in the PS scheme, it is difficult for the PS scheme to be applied to a field requiring a wide-band operation and a rapid frequency change.

The TTD scheme refers to a method of forming a phase difference by changing a start point of a phase by using a time delay difference of a signal. A configuration of the beamforming device in a general TTD scheme may be divided into a ring resonator-based configuration and a distribution configuration using a multi-wavelength light source and a WDM scheme. The ring resonator-based configuration has a bandwidth limited to several GHz, and has a relatively-short delay time of several nanoseconds. Because the distribution configuration using a multi-wavelength light source and a WDM scheme is complex, integration is difficult and production costs are high.

SUMMARY

Embodiments of the present disclosure provide an optical beamforming device using a phased array antenna, which performs beamforming regardless of a bandwidth and has a simple configuration and operation, and an operating method thereof.

According to an embodiment, an optical beamforming device includes an RF front-end configured to receive a plurality of RF antenna input signals or to transmit a plurality of RF antenna output signals, using a phased array antenna (PAA) having a plurality of channels and an optical beamformer configured to form or compensate for a time delay for each of the plurality of channels based on the plurality of RF antenna input signals and an RF input signal from an RF back-end. The optical beamformer includes a plurality of E/O converters converting the plurality of RF antenna input signals into a plurality of input optical signals, respectively, a linear modulator generating an optical modulation signal based on an RF input signal from the RF back-end, a true time delay (TTD) array outputting an optical combined signal for compensating for a time delay degree of the input optical signals or outputting output optical signals, in each of which a time delay is formed for each channel, by distributing the optical modulation signal, a photo detector generating an RF output signal to an RF back-end based on the optical combined signal, and a plurality of O/E converters converting the output optical signals into the plurality of RF antenna output signals, respectively.

According to an embodiment, an operating method at a point in time when an optical beamforming device transmits an RF signal to an outside includes linearly modulating, by a linear modulator, an RF antenna input signal to an optical signal based on the RF antenna input signal received from an RF back-end, generating, by a TTD array, a plurality of optical distribution signals for distributing the optical signal to a plurality of TTD elements for respective channels, by using a power splitter, generating, by the TTD array, output optical signals obtained by delaying the plurality of optical distribution signals in real time by a delay time required for the each channel, based on an electrical control signal, converting, by a plurality of O/E converters, the output optical signals into RF antenna output signals, respectively, and radiating, by a plurality of antenna elements, the RF antenna output signals to the outside.

According to an embodiment, an operating method at a point in time when an optical beamforming device receives an RF signal from an outside includes respectively receiving, by antennas, RF antenna input signals for channels from the outside, converting, by a plurality of E/O converters, the RF antenna input signals into input optical signals, respectively, generating, by a TTD array, optical compensation signals for compensating for the input optical signals by a delay time based on an electrical control signal, generating, by the TTD array, an optical combined signal obtained by combining the optical compensation signals by using a power combiner, and generating, by a balanced detector, an RF output signal to an RF back-end based on the optical combined signal.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described in detail and clearly to such an extent that an ordinary one in the art easily implements the present disclosure.

Figure 1:
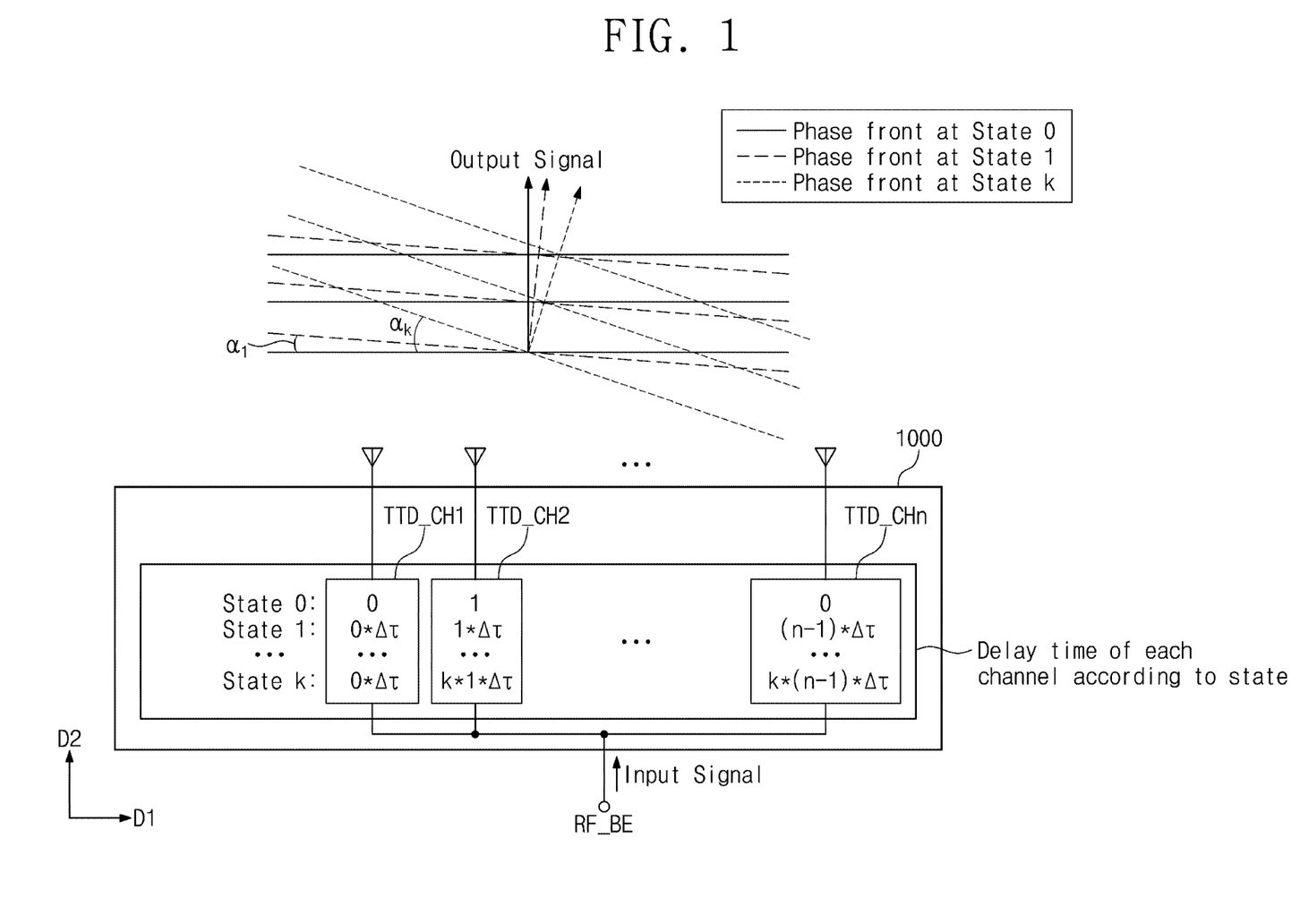
FIG. 1 is a conceptual diagram of beamforming according to an embodiment of the present disclosure.

FIG. 1 is a conceptual diagram of beamforming according to an embodiment of the present disclosure. An optical beamforming device 1000 according to an embodiment of the present disclosure may use a linear phased array antenna (PAA). The optical beamforming device 1000 may transmit an output signal based on an input signal from a radio frequency (RF) back-end RF_BE; alternatively, the optical beamforming device 1000 may deliver the output signal to the RF back-end RF_BE based on the input signal received from the outside. For convenience of description, assuming that an output signal is transmitted based on an input signal from the RF back-end RF_BE, descriptions will be given below.

For example, a linear PAA may include 'n' antenna elements. Here, 'n' is a natural number of 2 or more. The 'n' antenna elements may establish channels, respectively. For example, when the linear PAA includes 10 antenna elements, 10 channels may be established. The optical beamforming device 1000 may radiate an output signal in a form of an electromagnetic wave in a desired direction through each channel, based on the input signal, which is in a form of an electrical signal and which is received from the RF back-end RF_BE. For example, the optical beamforming device 1000 may differently set delay times of channels, by using a true time delay (hereinafter, referred to as "TTD") scheme. The optical beamforming device 1000 may change a radiation direction of the linear PAA by using a phase start point difference according to a delay time of each channel.

The output signal of the optical beamforming device 1000 may have a specific phase front. For example, a state having a specific phase front may correspond to State 0, State 1, ..., State k depending on a radiation angle of the linear PAA, and is not limited to the radiation angle shown in FIG. 1. Here, 'k' is 0 or any natural number. For example, when the output signal of the optical beamforming device 1000 corresponds to State 0, the phase front (Phase front at State 0) of the output signal may be a plane perpendicular to direction D2, and a radiation direction of the signal may be direction D2 perpendicular to the phase front. Here, direction D1 is a direction of an arbitrary vector on an arbitrary plane. When the output signal of the optical beamforming device 1000 corresponds to State 1, the phase front (Phase front at State 1) of the output signal may be parallel to a direction having an angular difference of $\alpha_1$ in a clockwise or counterclockwise direction based on direction D1. The radiation direction of a signal may be a direction perpendicular to the phase front. In accordance with the same principle, when the output signal of the optical beamforming device 1000 corresponds to State k, the phase front (Phase front at State k) of the output signal may be parallel to a direction having an angular difference of $\alpha_k$ in a clockwise or counterclockwise direction based on direction D1. The radiation direction of a signal may be a direction perpendicular to the phase front.

To specify the phase front of a signal, delay times of channels of the optical beamforming device 1000 may be set differently. For example, when a unit delay time is defined as $\Delta\tau$, the TTD (TTD_CHn) of channel n may be defined depending on Equation 1.

$$t_n = k(n-1)\Delta\tau \quad \text{[Equation 1]}$$

Referring to Equation 1, 'n' is defined as a continuous order of each channel, and '$t_n$' is defined as a delay time of channel n that is a n-th channel. 'k' is defined as a specific state (e.g., State 0, State 1, ..., State k) of an output signal of the optical beamforming device 1000. $\Delta\tau$ is defined as a unit delay time. For example, the TTD TTD_CHn of channel n may be determined as "$k*(n-1)*\Delta\tau$" depending on Equation 1. For example, the TTD TTD_CH2 of channel 2 may be determined as "$k*1*\Delta\tau$". As a result, the optical beamforming device 1000 may radiate an output signal having a specific phase front based on the continuous TTD of each channel.

As illustrated in FIG. 1, the optical beamforming device 1000 may linearly rotate a phase front so as to have a discrete time delay. According to an embodiment of the present disclosure, the optical beamforming device 1000 may nonlinearly control a time delay of each channel to finely tune the output signal. For example, although not illustrated in FIG. 1, the optical beamforming device 1000 may further include a phase tuner PT for nonlinear control of a time delay.

Figure 2:
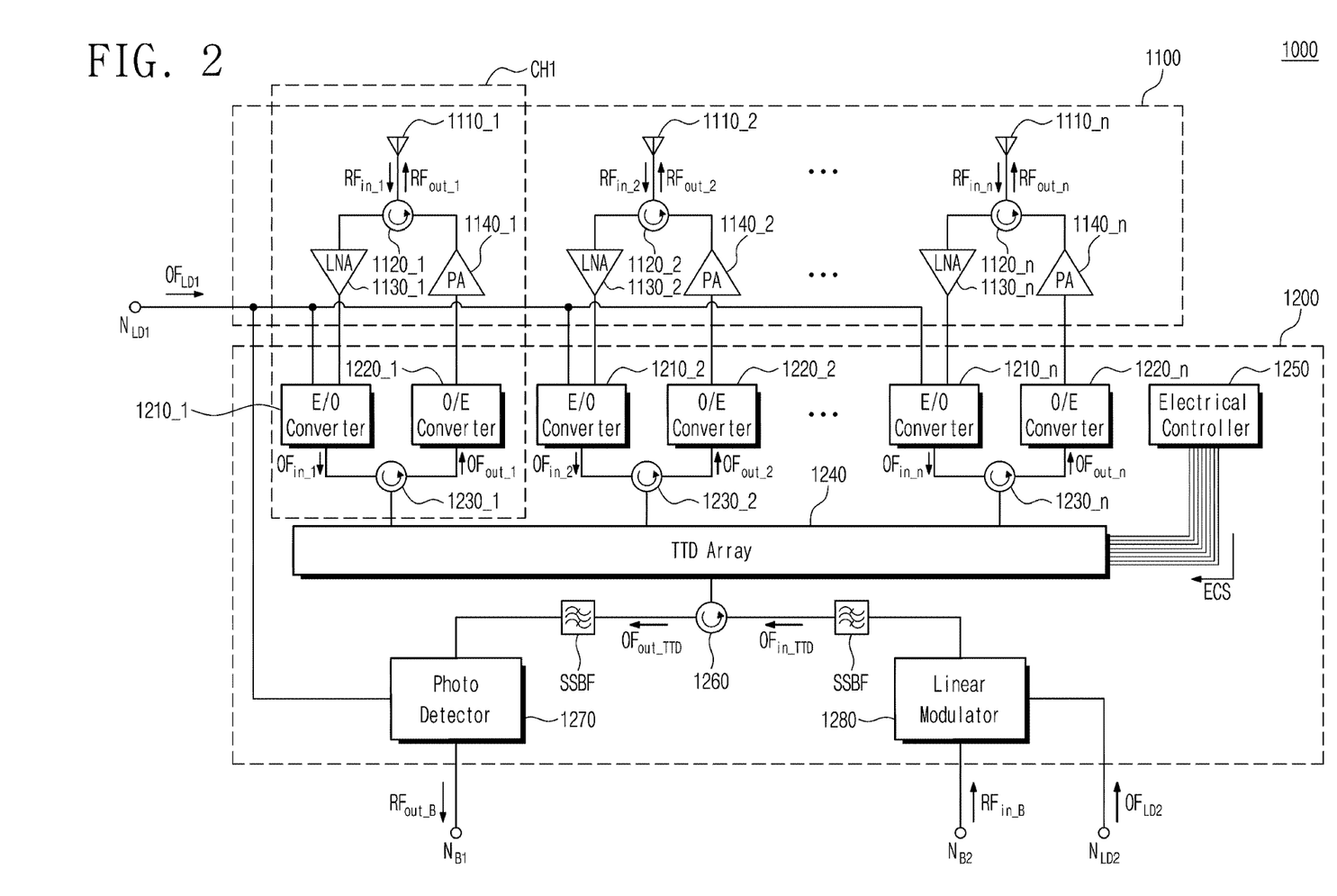
FIG. 2 is a configuration diagram schematically illustrating an optical beamforming device according to an embodiment of the present disclosure.

FIG. 2 is a configuration diagram schematically illustrating an optical beamforming device according to an embodiment of the present disclosure. The optical beamforming device 1000 may include an RF front-end 1100 and an optical beamformer 1200. The optical beamforming device 1000 according to an embodiment of the present disclosure may transmit and/or receive a signal. Accordingly, as shown in FIG. 2, the optical beamforming device 1000 may be configured to perform both a transmission function and a reception function in each of the antenna elements. Although not illustrated in FIG. 2, the optical beamforming device 1000 may be configured such that each of the antenna elements performs at least one of the transmission function and the reception function.

The RF front-end 1100 may include antenna elements 1110_1 to 1110_n, first circulators 1120_1 to 1120_n, low noise amplifiers (LNAs) 1130_1 to 1130_n, and power amplifiers (PAs) 1140_1 to 1140_n. The RF front-end 1100 may transmit an output signal to the outside by using a PAA having a plurality of channels or may receive an input signal from the outside by using the PAA having a plurality of channels. Furthermore, the RF front-end 1100 may amplify power before transmitting the output signal to the outside or may amplify the power while minimizing the noise of a signal after the RF front-end 1100 receives an external input signal.

The antenna elements 1110_1 to 1110_n may radiate electromagnetic waves to the outside based on RF antenna output signals $RF_{out\_1}$ to $RF_{out\_n}$ in a form of an electrical signal, respectively; alternatively, the antenna elements 1110_1 to 1110_n may receive RF antenna input signals $RF_{in\_1}$ to $RF_{in\_n}$ in a form of an electrical signal based on external electromagnetic waves, respectively. The first circulators 1120_1 to 1120_n may be a non-reciprocal electronic device having 3 ports. The first circulators 1120_1 to 1120_n may transmit the RF antenna input signals $RF_{in\_1}$ to $RF_{in\_n}$, which are received from the outside by the antenna elements 1110_1 to 1110_n, to the LNAs 1130_1 to 1130_n, respectively. Alternatively, the first circulators 1120_1 to 1120_n may transmit the RF antenna output signals $RF_{out\_1}$ to $RF_{out\_n}$ from the PAs 1140_1 to 1140_n to the antenna elements 1110_1 to 1110_n, respectively. The LNAs 1130_1 to 1130_n may amplify power while minimizing noises of the RF antenna input signals $RF_{in\_1}$ to $RF_{in\_n}$, respectively. The PAs 1140_1 to 1140_n may generate the RF antenna output signals $RF_{out\_1}$ to $RF_{out\_n}$, in each of which an RF signal is amplified, for external transmission.

The optical beamformer 1200 may include E/O converters 1210_1 to 1210_n, O/E converters 1220_1 to 1220_n, second circulators 1230_1 to 1230_n, a TTD array 1240, a third circulator 1260, a photo detector 1270, and a linear modulator 1280. The optical beamformer 1200 may convert an RF signal into an optical signal, may delay the optical signal in real time by using a TTD scheme, and may form or compensate for a phase start point difference of a signal for each channel.

The E/O converters 1210_1 to 1210_n may respectively generate input optical signals $OF_{in\_1}$ to $OF_{in\_n}$ based on a first optical reference signal $OF_{LD1}$ and the RF antenna input signals $RF_{in\_1}$ to $RF_{in\_n}$ amplified by LNAs. Here, the first optical reference signal $OF_{LD1}$ may be generated by a first laser diode LD1 (not illustrated). For example, the first laser diode LD1 may be located externally. In this case, the first laser diode LD1 may be connected to a LD1 node $N_{LD1}$ so as to deliver the first optical reference signal $OF_{LD1}$ to the E/O converters 1210_1 to 1210_n. However, unlike the example illustrated in FIG. 2, the first laser diode LD1 may be included in the optical beamforming device 1000 so as to transmit the first optical reference signal $OF_{LD1}$ to the E/O converters 1210_1 to 1210_n.

For example, the E/O converters 1210_1 to 1210_n may perform electro-optic transformation by optically modulating the RF antenna input signals $RF_{in\_1}$ to $RF_{in\_n}$ by using the first optical reference signal $OF_{LD1}$, respectively. According to an embodiment of the present disclosure, the E/O converters 1210_1 to 1210_n may include Mach-Zehnder modulators (MZM) for optical modulation of an electrical signal. As a result, the E/O converters 1210_1 to 1210_n may generate the input optical signals $OF_{in\_1}$ to $OF_{in\_n}$, respectively.

The O/E converters 1220_1 to 1220_n may generate the RF antenna output signals $RF_{out\_1}$ to $RF_{out\_n}$ based on the output optical signals $OF_{out\_1}$ to $OF_{out\_n}$, respectively. According to an embodiment of the present disclosure, each of the O/E converters 1220_1 to 1220_n may include a photo detector (PD) for electrical modulation of an optical signal. Herein, the photo detector is a configuration separate from the photo detector 1270 illustrated in FIG. 2.

The second circulators 1230_1 to 1230_n may deliver the input optical signals $OF_{in\_1}$ to $OF_{in\_n}$ from the E/O converters 1210_1 to 1210_n to the TTD array 1240, respectively; alternatively, the second circulators 1230_1 to 1230_n may deliver the output optical signals $OF_{out\_1}$ to $OF_{out\_n}$ from the TTD array 1240 to the O/E converters 1220_1 to 1220_n.

The TTD array 1240 may generate an optical combined signal $OF_{out\_TTD}$ based on at least part of the plurality of input optical signals $OF_{in\_1}$ to $OF_{in\_n}$; alternatively, the TTD array 1240 may generate the output optical signals $OF_{out\_1}$ to $OF_{out\_n}$ based on an optical modulation signal $OF_{in\_TTD}$. For example, the TTD array 1240 may be controlled by an electrical control signal ECS, and may form or compensate for a time delay based on a transmission/reception signal of each channel. Accordingly, the TTD array 1240 may form or compensate for a phase start point difference by varying the degree of TTD for each channel. The detailed configuration and operation of the TTD array 1240 will be described with reference to FIGS. 3 to 4.

An electrical controller 1250 may control an operation of the TTD array 1240. For example, the electrical controller 1250 may control an optical switch (hereinafter referred to as "OSW") included in the TTD array 1240 by transmitting the electrical control signal ECS to the TTD array 1240. The electrical controller 1250 may adjust the degree of TTD formed by the TTD array 1240 by controlling the OSW. The detailed operation of the electrical controller 1250 will be described with reference to FIGS. 5 to 6.

The third circulator 1260 may deliver the optical combined signal $OF_{out\_TTD}$ from the TTD array 1240 to the photo detector 1270 or may deliver the optical modulation signal $OF_{in\_TTD}$ from the linear modulator 1280 to the TTD array 1240. According to an embodiment of the present disclosure, the optical beamformer 1200 may further include a single-side band filter (hereinafter, referred to as "SSBF"). The SSBF may be positioned between the TTD array 1240 and the photo detector 1270 and/or between the TTD array 1240 and the linear modulator 1280. The SSBF may suppress signal distortion by filtering the optical combined signal $OF_{out\_TTD}$ and/or the optical modulation signal $OF_{in\_TTD}$.

The photo detector 1270 may generate an RF output signal $RF_{out\_B}$ to a back-end, based on the optical combined signal $OF_{out\_TTD}$ and the first optical reference signal $OF_{LD1}$. The photo detector 1270 may deliver the RF output signal $RF_{out\_B}$ to a back-end, to a back-end input node $N_{B1}$ connected to an RF back-end. For example, the photo detector 1270 may be implemented with a photo diode PD. According to an embodiment of the present disclosure, the photo detector 1270 may perform balanced detection that improves a signal-to-noise ratio (SNR) by removing correlated noise from the optical combined signal $OF_{out\_TTD}$ and the first optical reference signal $OF_{LD1}$ through differential amplification.

The linear modulator 1280 may generate the optical modulation signal $OF_{in\_TTD}$, based on a second optical reference signal $OF_{LD2}$ and a RF input signal $RF_{in\_B}$ from the back-end. The linear modulator 1280 may be connected to a back-end output node $N_{B2}$ connected to the RF back-end so as to receive the RF input signal $RF_{in\_B}$ from the back-end that is the output signal of the RF back-end. Modulator, the linear modulator 1280 may be connected to an LD2 node $N_{LD2}$ connected to a second laser diode LD2 so as to receive the second optical reference signal $OF_{LD2}$. According to an embodiment of the present disclosure, the second laser diode LD2 may be located externally. Unlike the example illustrated in FIG. 2, the second laser diode LD2 may be included in the optical beamforming device 1000. According to an embodiment of the present disclosure, the linear modulator 1280 may perform a single-side band operation.

Figure 3:
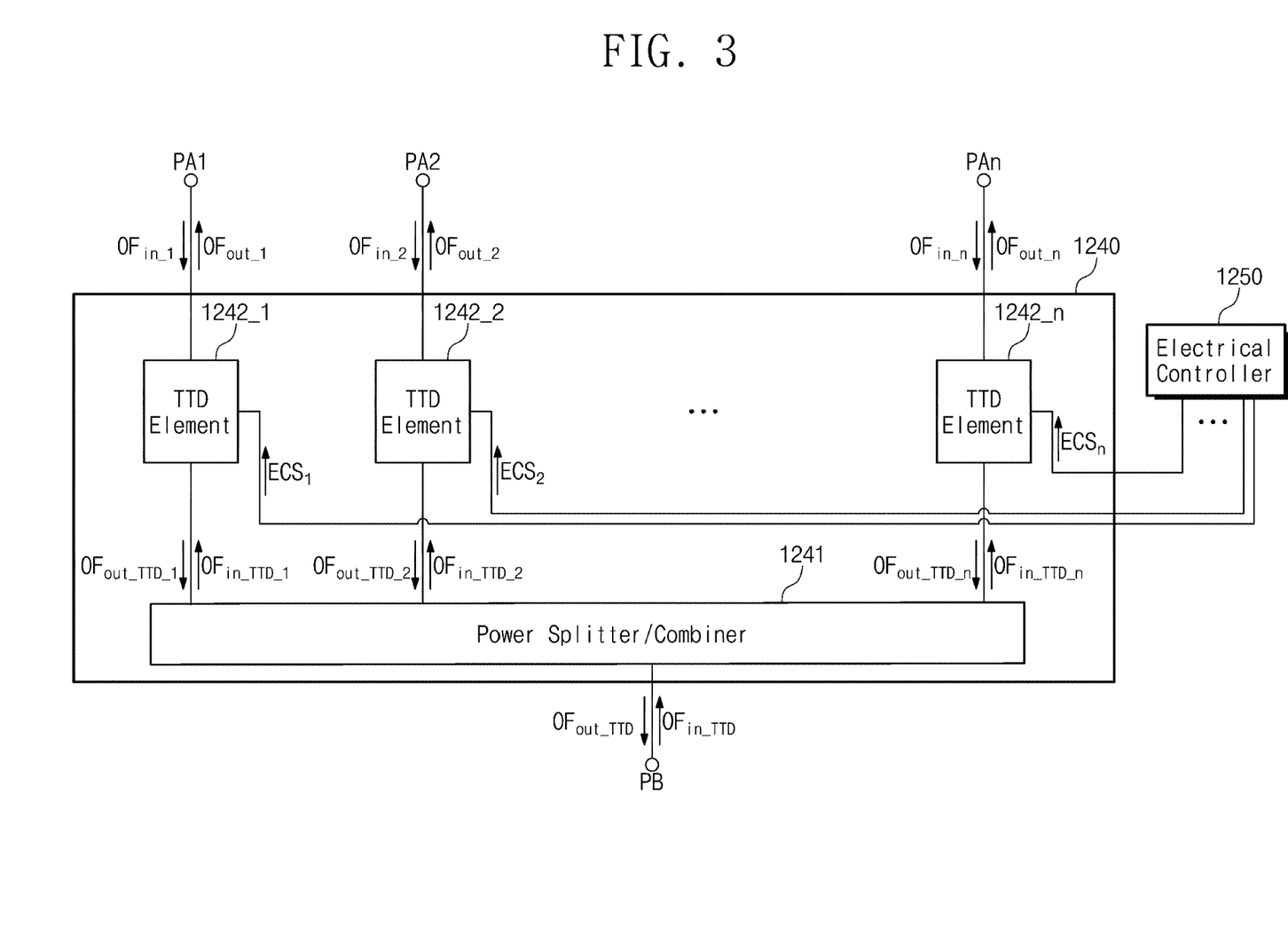
FIG. 3 is a configuration diagram illustrating a configuration of the TTD array 1240 illustrated in FIG. 2 in more detail.

FIG. 3 is a configuration diagram illustrating a configuration of the TTD array 1240 illustrated in FIG. 2 in more detail. The TTD array 1240 may include a power splitter/combiner 1241, and TTD elements 1242_1 to 1242_n.

The power splitter/combiner 1241 may operate as a power splitter when the optical modulation signal $OF_{in\_TTD}$ is received. In this case, the power splitter/combiner 1241 may deliver optical distribution signals $OF_{in\_TTD\_1}$ to $OF_{in\_TTD\_n}$ to the TTD elements 1242_1 to 1242_n connected to the ports PA1 to PAn of channels (e.g., channel 1 CH1 in FIG.

1) based on the optical modulation signal $OF_{in\_TTD}$, respectively. Furthermore, the power splitter/combiner 1241 may operate as a power combiner when a plurality of optical compensation signals $OF_{out\_TTD\_1}$ to $OF_{out\_TTD\_n}$ are received. In this case, the power splitter/combiner 1241 may deliver the optical combined signal $OF_{out\_TTD}$ to an output port PB of the TTD array 1240 based on at least part of a plurality of optical compensation signals $OF_{out\_TTD\_1}$ to $OF_{out\_TTD\_n}$.

For example, the power splitter/combiner 1241 may be implemented in the form of an optical fiber or an optical waveguide. For example, when the power splitter/combiner 1241 is in a form of an optical waveguide, the power splitter/combiner 1241 may be implemented with a material of silica $SiO_2$, silicon Si, amorphous silicon, silicon nitride SiNx, silicon oxynitride SiON, or the like.

The TTD elements 1242_1 to 1242_n may generate the optical compensation signals $OF_{out\_TTD\_1}$ to $OF_{out\_TTD\_n}$ based on the input optical signals $OF_{in\_1}$ to $OF_{in\_n}$ from channel ports PA1 to PAn so as to be delivered to the channel ports PA1 to PAn, respectively; alternatively, the TTD elements 1242_1 to 1242_n may generate the output optical signals $OF_{out\_1}$ to $OF_{out\_n}$ based on the optical distribution signals $OF_{in\_TTD\_1}$ to $OF_{in\_TTD\_n}$ so as to be delivered to the channel ports PA1 to PAn, respectively. For example, the TTD elements 1242_1 to 1242_n may vary the degree of TTD for input signals and then may compensate for or form a phase start point difference so as to be output. The electrical controller 1250 may adjust the TTD degree of signals, which are respectively entered into the TTD elements 1242_1 to 1242_n, through electrical control signals $ECS_1$ to $ECS_n$, respectively. According to an embodiment of the present disclosure, the electrical control signal ECS (e.g., ECS1) may include a plurality of control signals. The detailed configurations and operations of the TTD elements 1242_1 to 1242_n will be described with reference to FIGS. 5 to 6.

Figure 4:
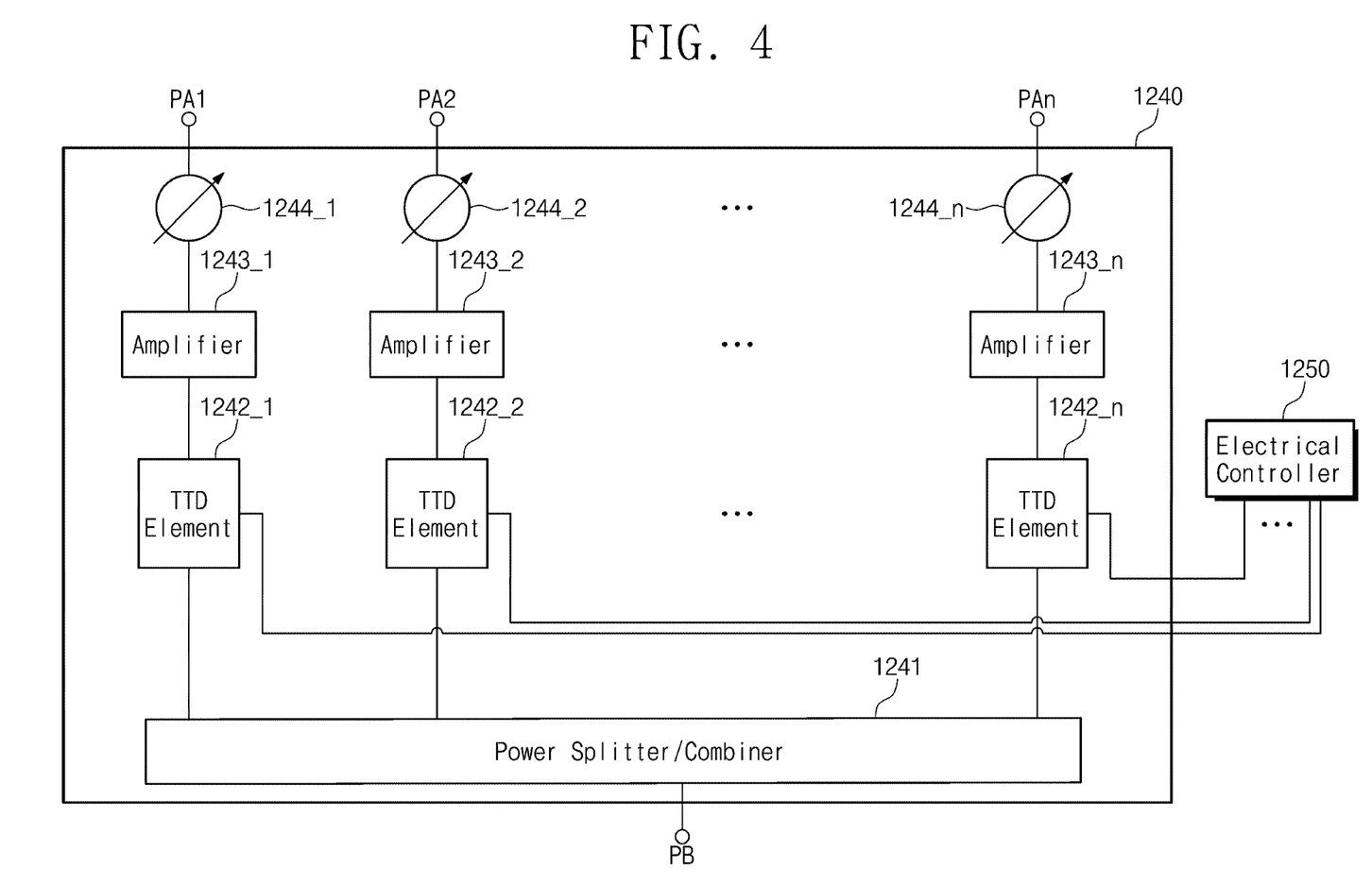
FIG. 4 is a configuration diagram illustrating a configuration of the TTD array 1240 illustrated in FIG. 3, according to an embodiment.

FIG. 4 is a configuration diagram illustrating a configuration of the TTD array 1240 illustrated in FIG. 3, according to an embodiment. FIG. 4 illustrates that some configurations are added to the TTD array 1240 illustrated in FIG. 3. For brevity of illustration, signals are not displayed in FIG. 4. The TTD array 1240 according to an embodiment of the present disclosure may further include amplifiers 1243_1 to 1243_n and attenuators 1244_1 to 1244_n. The amplifiers 1243_1 to 1243_n and the attenuators 1244_1 to 1244_n may amplify or attenuate the strength of signals input/output to or from the TTD elements 1242_1 to 1242_n. The amplifiers 1243_1 to 1243_n and the attenuators 1244_1 to 1244_n are not limited to a connection relationship illustrated in FIG. 4. As long as the amplifiers 1243_1 to 1243_n and the attenuators 1244_1 to 1244_n amplify or attenuate the strength of signals input or output to the TTD array 1240, the amplifiers 1243_1 to 1243_n and the attenuators 1244_1 to 1244_n may be arbitrarily located within the TTD array 1240. Although not illustrated in FIG. 4, the TTD array 1240 may further include a phase tuner (PT) for adjusting a nonlinear fine phase.

Figure 5:
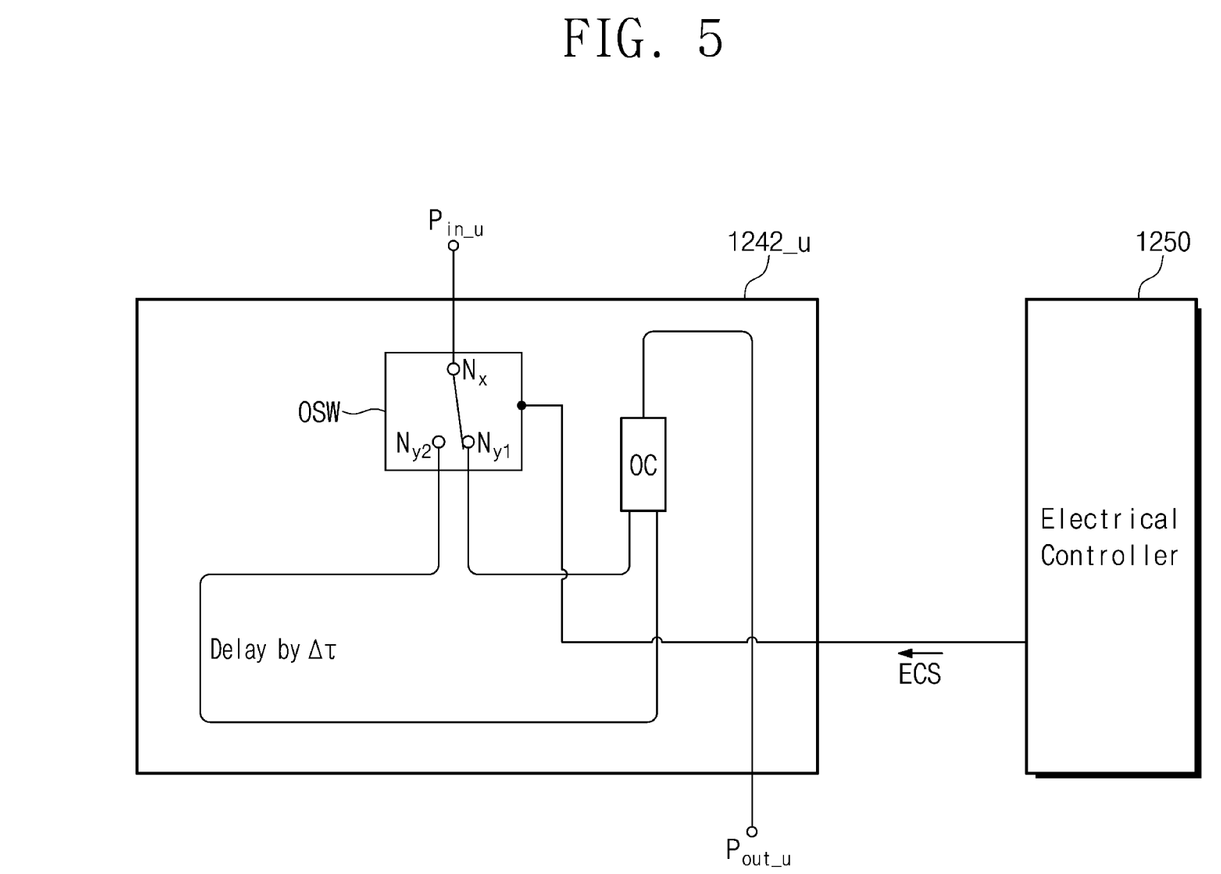
FIG. 5 is a block diagram illustrating a unit cell constituting a TTD element illustrated in FIGS. 2 to 3.

FIG. 5 is a block diagram illustrating a unit cell constituting a TTD element illustrated in FIGS. 2 to 3. Each of the TTD elements 1242_1 to 1242_n in FIG. 3 may be composed of a plurality of unit cells 1242_u. The unit cell 1242_u of a TTD element may include a 1×2 optical switch (hereinafter referred to as "OSW"), and a 2×1 optical combiner (hereinafter referred to as "OC"). For example, the OSW may be made of a compound semiconductor material such as indium phosphide (InP), gallium arsenide (GaAs), or the like or may be implemented in a form of a polymer total internal reflection (TIR) switch.

As compared to a signal input to an input port $P_{in\_u}$ of the unit cell, the unit cell 1242_u may delay or may not delay a signal, which is output to an output port $P_{out\_u}$ of the unit cell, by a unit delay time $\Delta\tau$, based on the electrical control signal ECS from the electrical controller 1250. Herein, the electrical control signal ECS refers to each electrical control signal, which is entered into each of cells constituting one of the plurality of TTD elements 1242_1 to 1242_n in FIG. 3 and constituting any of the plurality of electrical control signals ECS1 to ECSn in FIG. 3. For example, the electrical control signal entered into the TTD element 1242_2 of channel 2 in FIG. 3 is $ECS_2$. $ECS_2$ is composed of electrical control signals entered into each of the unit cells 1242_u in a TTD element. Because the unit cell 1242_u is non-reciprocally implemented with respect to the input port $P_{in\_u}$ of the unit cell and the output port $P_{out\_u}$ of the unit cell, a signal needs to be entered from the input port $P_{in\_u}$ of the unit cell to the unit cell 1242_u.

When the signal input from the input port $P_{in\_u}$ of a unit cell is entered into an x node $N_x$ of the OSW, the OSW may connect the x node $N_x$ to a y1 node $N_{y1}$ or a y2 node $N_{y2}$ depending on an on/off state of the electrical control signal ECS of the electrical controller 1250. Herein, the on/off state of the electrical control signal ECS determines whether to delay a signal by a unit delay time $\Delta\tau$. For example, assuming that the electrical control signal ECS corresponds to an off state, the electrical control signal ECS does not indicate a time delay. In this case, the x node $N_x$ of the OSW is connected to the y1 node $N_{y1}$ connected to a first path. On the other hand, assuming that the electrical control signal ECS corresponds to an on state, the electrical control signal ECS indicates a time delay. The OSW may switch to the y2 node $N_{y2}$ connected to a second path longer than the first path so as to be delayed by the unit delay time $\Delta\tau$. However, a connection relationship of the OSW according to the on/off state of the electrical control signal ECS is not limited to that described above. The connection relationship may be opposite to the above description (e.g., when the electrical control signal ECS corresponds to an off state, the x node $N_x$ is connected to the y2 node $N_{y2}$. When the electrical control signal ECS corresponds to an on state, the x node $N_x$ is connected to the y1 node $N_{y1}$). The OC may be configured to connect the first path and the second path.

Figure 6:
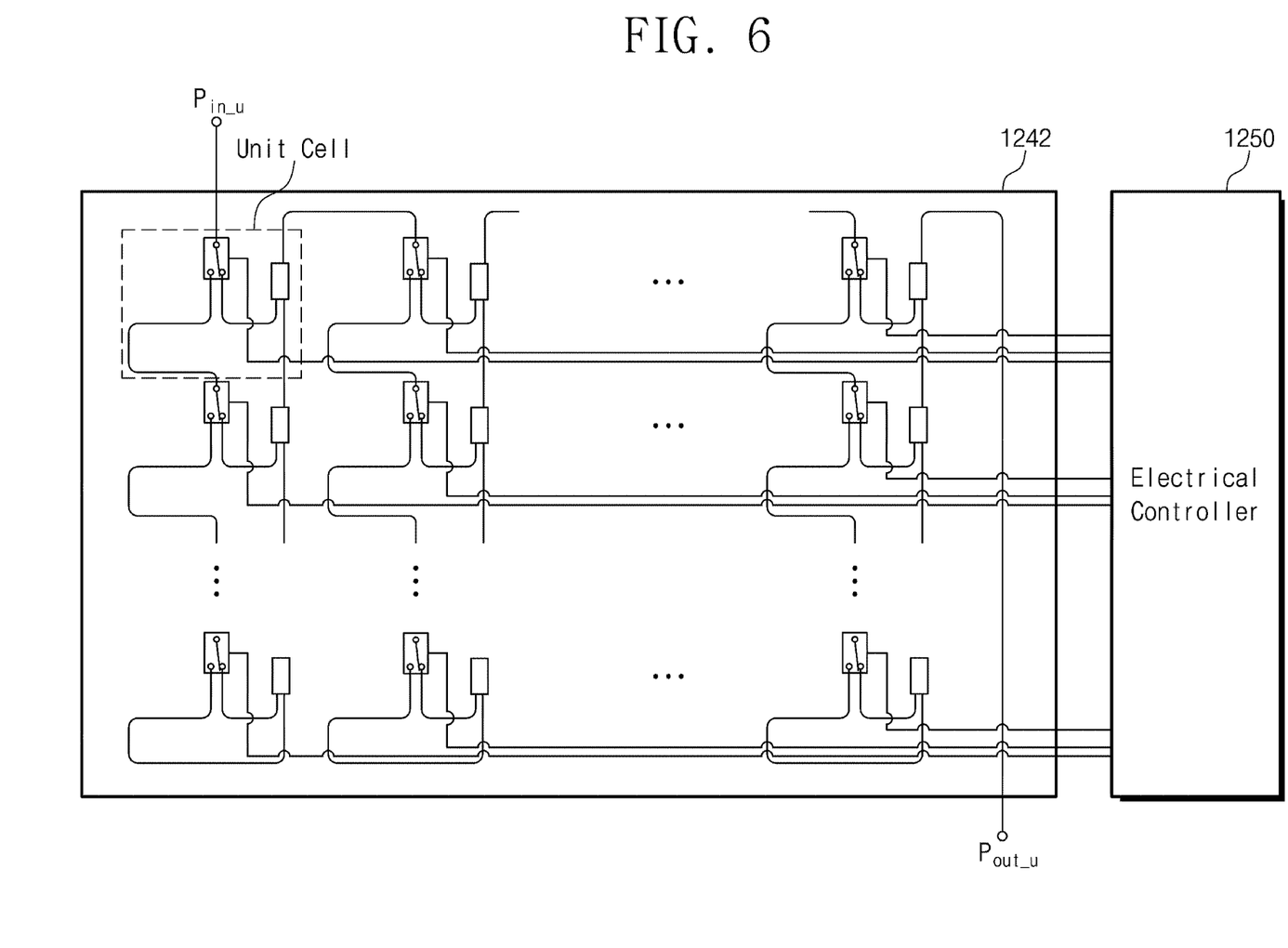
FIG. 6 is a configuration diagram illustrating a configuration of the TTD element illustrated in FIGS. 2 to 3 in more detail.

FIG. 6 is a configuration diagram illustrating a configuration of the TTD element illustrated in FIGS. 2 to 3 in more detail. Referring to FIGS. 5 and 6, a TTD element 1242 may include a plurality of unit cells Unit Cell 1242_u. Because the unit cell 1242_u of FIG. 5 is substantially the same as a unit cell Unit Cell of FIG. 6, reference numbers and signals of the unit cell are not displayed in FIG. 6 for brevity of illustration. Each unit cell Unit Cell constituting the TTD element 1242 may be controlled by the plurality of the electrical control signals ECSs from the electrical controller 1250. Assuming that the unit cell Unit Cell delays a signal by a unit delay time $\Delta\tau$ when the electrical control signal ECS is in an on state, descriptions will be given below. When the number of OSWs that receive the electrical control signal ECS in the on state is defined as 'M', the total delay time of a signal by the TTD element 1242 may be calculated as "$M*\Delta\tau$". Herein, assuming that the number of OSWs inside the TTD element 1242 is defined as 'm' and the number of channels is defined as 'n', 'm' may be greater than or equal to 'n−1', and 'M' may correspond to an arbitrary integer between 0 and 'm'.

Because the unit cell Unit Cell is non-reciprocally implemented with respect to an input port $P_{in\_n}$ of the unit cell and an output port $P_{out\_u}$ of the unit cell, the TTD element 1242 composed of a plurality of unit cells Unit Cell is also non-reciprocally implemented with respect to an input port $P_{in}$ and an output port $P_{out}$. Accordingly, although not illustrated in FIG. 6, the optical beamforming device 1000 according to an embodiment of the present disclosure includes a transmission TTD element and a reception TTD element to be different from each other. For example, the transmission TTD element may receive the optical distribution signals $OF_{in\_TTD\_1}$ to $OF_{in\_TTD\_n}$ from the input port $P_{in}$ and may output the output optical signals $OF_{out\_1}$ to $OF_{out\_n}$ to the output port $P_{out}$. For example, the reception TTD element may receive the input optical signals $OF_{in\_1}$ to $OF_{in\_n}$ from the input port $P_{in}$ and may output the optical compensation signals $OF_{out\_TTD\_1}$ to $OF_{out\_TTD\_n}$ to the output port $P_{out}$.

Figure 7:
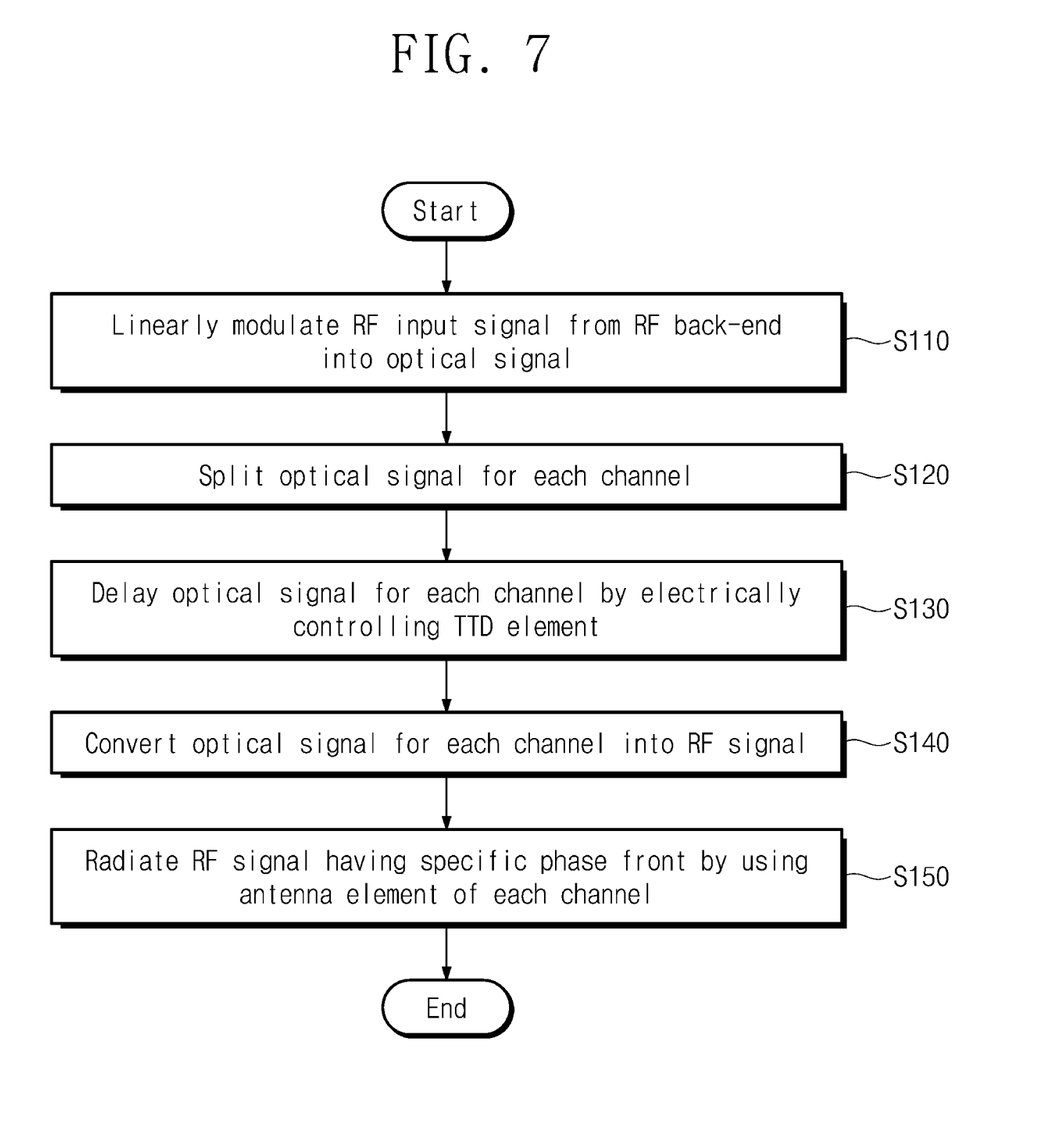
FIG. 7 is a flowchart in a case where a PAA transmits a signal in an optical beamforming method, according to an embodiment of the present disclosure.

FIG. 7 is a flowchart in a case where a PAA transmits a signal in an optical beamforming method, according to an embodiment of the present disclosure. For convenience of description, FIG. 7 will be described with reference to reference numerals/marks of FIGS. 1 to 3.

In operation S110, the linear modulator 1280 may linearly modulate the RF input signal $RF_{in\_B}$ from a back-end to an optical signal, based on the second optical reference signal $OF_{LD2}$ and the RF input signal $RF_{in\_B}$ from the back-end, which is received from the RF back-end.

In operation S120, the TTD array 1240 may distribute the TTD input optical signal $OF_{in\_TTD}$, which is a linearly modulated optical signal, to the TTD elements 1242_1 to 1242_n for respective channels by using a power splitter and then may generate the optical distribution signals $OF_{in\_TTD\_1}$ to $OF_{in\_TTD\_n}$.

In operation S130, the TTD array 1240 may delay the optical distribution signals $OF_{in\_TTD\_1}$ to $OF_{in\_TTD\_n}$ in real time by a delay time required in each of channels CH1 to CHn, based on the electrical control signal ECS from the electrical controller 1250. Herein, the delay time required in each of the channels CH1 to CHn is defined by the relationship of Equation 1 described above.

In operation S140, the O/E converters 1220_1 to 1220_n may convert output optical signals $OF_{out\_1}$ to $OF_{out\_n}$, which are output by the TTD array 1240, for respective channels into RF signals.

In operation S150, the antenna elements 1110_1 to 1110_n may radiate RF antenna output signals $RF_{out\_1}$ to $RF_{out\_n}$, which are the converted RF signals, as electromagnetic wave-type signals having a phase front in a specific state (e.g., State 0, State 1, . . . , State k) to the outside.

Figure 8:
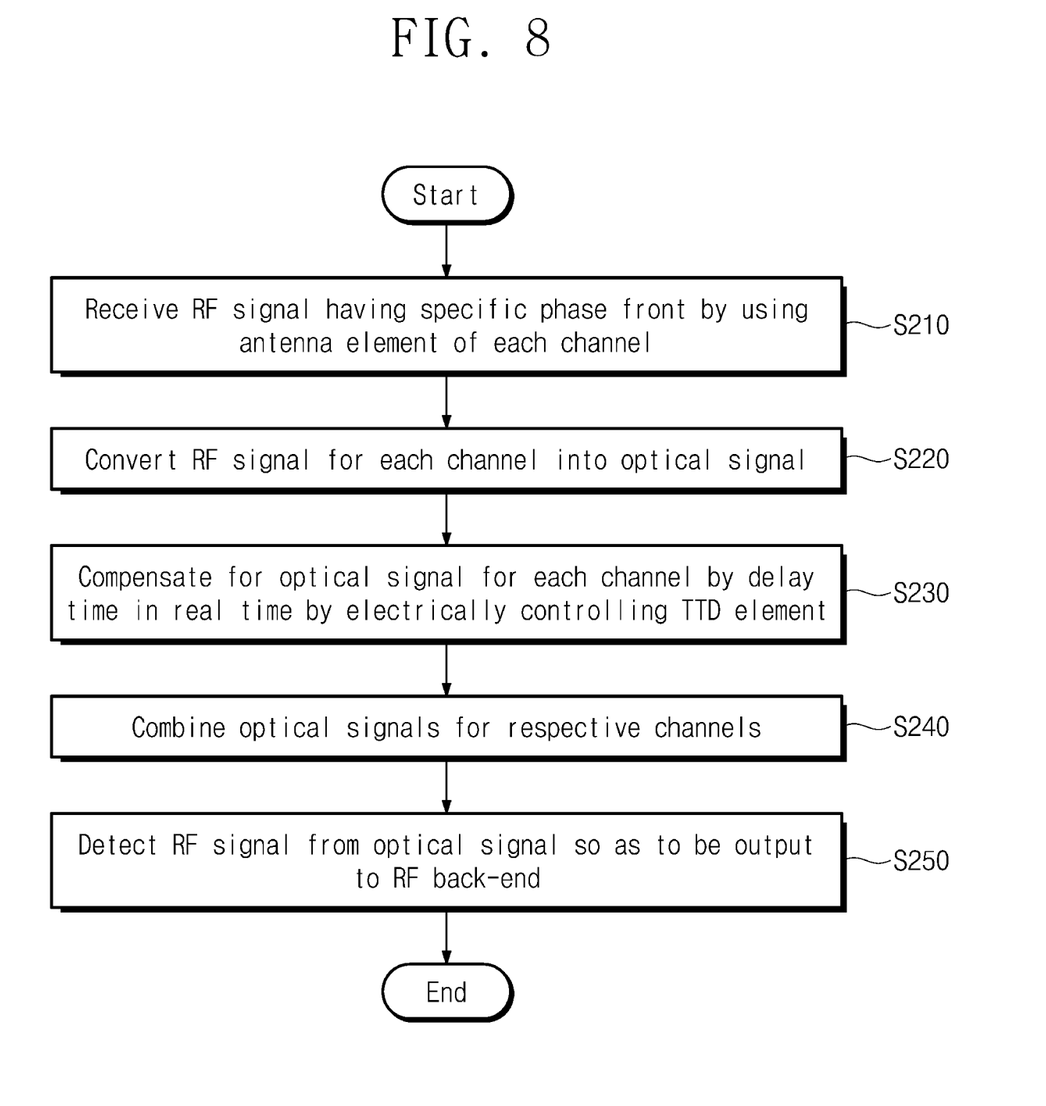
FIG. 8 is a flowchart in a case where a PAA receives a signal in an optical beamforming method, according to an embodiment of the present disclosure.

FIG. 8 is a flowchart in a case where a PAA receives a signal in an optical beamforming method, according to an embodiment of the present disclosure. For convenience of description, FIG. 8 will be described with reference to reference numerals/marks of FIGS. 1 to 3.

In operation S210, the antenna elements 1110_1 to 1110_n constituting the PAA may receive an external electromagnetic wave-type signal having a phase front in a specific state (e.g., State 0, State 1, . . . , State k) as an RF-type signal.

In operation S220, the E/O converters 1210_1 to 1210_n may convert the RF antenna input signals $RF_{in\_1}$ to $RF_{in\_n}$, which are received by the antenna elements 1110_1 to 1110_n, into the input optical signals $OF_{in\_1}$ to $OF_{in\_n}$ that are optical signals.

In operation S230, the TTD array 1240 may compensate for the input optical signals $OF_{in\_1}$ to $OF_{in\_n}$ by a delay time based on the electrical control signal ECS from the electrical controller 1250. Here, the delayed time is defined as the relationship of Equation 1 described above.

In operation S240, the TTD array 1240 may combine the optical compensation signals $OF_{out\_TTD\_1}$ to $OF_{out\_TTD\_n}$, which are output signals of the TTD elements 1242_1 to 1242_n for respective channels, using a power combiner and then may generate the optical combined signal $OF_{out\_TTD}$.

In operation S250, the photo detector 1270 may detect an RF signal based on the optical combined signal $OF_{out\_TTD}$ and the first optical reference signal $OF_{LD1}$. The RF output signal $RF_{out\_B}$ to the back-end, which is the detected RF signal, may be output to the RF back-end.

According to an embodiment of the present disclosure, because an optical path and a time delay are determined regardless of a wavelength or frequency of a beam, beamforming may be performed without bandwidth limitation.

According to an embodiment of the present disclosure, it is easy to operate and control a optical beamforming device due to the same time delay for each unit cell constituting a TTD element. In addition, the TTD element may be integrated together with peripheral elements while being implemented in a form of a chip.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:
1. An optical beamforming device comprising:
an RF front-end configured to transmit a plurality of RF antenna output signals, by using a phased array antenna (PAA) having a plurality of channels; and
an optical beamformer configured to form a time delay for each of the plurality of channels based on an RF input signal from an RF back-end,
wherein the optical beamformer includes:
a linear modulator configured to generate an optical modulation signal based on the RF input signal from the RF back-end;
a true time delay (TTD) array configured to output a plurality of output optical signals, in each of which a time delay is formed for each channel, by distributing the optical modulation signal;
an electrical controller configured to generate an electrical control signal for controlling a degree of the time delay; and
a plurality of O/E converters configured to convert the plurality of output optical signals into the plurality of RF antenna output signals, respectively;
wherein the TTD array discretely determines the degree of the time delay according to Equation 1 below for the plurality of channels,
$t_n = k(n-1)\Delta\tau$ (Equation 1) where 'n' is a continuous order of an individual channel; $t_n$ is a delay time of channel n; 'k' is an integer greater than or equal to 0 as a state value according to a phase front rotation angle of the plurality of RF antenna output signals; and $\Delta\tau$ is a unit delay time,
wherein the TTD array includes:
a plurality of TTD circuits configured to generate the plurality of output optical signals obtained by forming time delays for the plurality of channels based on a plurality of optical distribution signals, respectively; and a power splitter configured to generate the plurality of optical distribution signals for the plurality of channels when the optical modulation signal is input, wherein each of the plurality of TTD circuits includes a plurality of unit cells, and wherein each of the unit cells includes:

an optical switch configured to switch to a first node connected to a first path when the electrical control signal does not indicate a time delay and to switch to a second node connected to a second path longer than the first path when the electrical control signal indicates the time delay; and an optical combiner configured to connect the first path and the second path.

2. The optical beamforming device of claim 1, wherein the RF front-end includes:

a plurality of antennas configured to transmit the plurality of RF antenna output signals for the plurality of channels, respectively; and a plurality of amplifiers configured to amplify the plurality of RF antenna output signals, respectively.

3. The optical beamforming device of claim 1, wherein the TTD array further includes a plurality of attenuators and a plurality of amplifiers corresponding to the plurality of channels respectively, wherein the plurality of attenuators and the plurality of amplifiers are configured to adjust strength of the plurality of output optical signals respectively.

4. The optical beamforming device of claim 1, wherein the TTD array further includes:

a phase tuner configured to non-linearly adjust phase of one of the plurality of output optical signals.

5. The optical beamforming device of claim 1, wherein the power splitter is implemented as an optical fiber or an optical waveguide.

6. The optical beamforming device of claim 5, when the power splitter implemented as the optical waveguide, the power splitter is made of a material of silica, silicon, amorphous silicon, silicon nitride, or silicon oxynitride.

7. The optical beamforming device of claim 1, wherein the optical combiner is implemented as an optical waveguide.

8. The optical beamforming device of claim 1, wherein the optical switch is made of a compound semiconductor material including indium phosphide (InP) or gallium arsenide (GaAs).

9. The optical beamforming device of claim 1, wherein the optical switch is implemented as a polymer total internal reflection (TIR) switch.

10. The optical beamforming device of claim 1, further comprising:

a single-side band filter (SSBF) positioned between the TTD array and the linear modulator.

11. An operating method of an optical beamforming device for outputting an RF signal, the method comprising:

linearly modulating, by a linear modulator, an RF antenna input signal to an optical modulation signal based on the RF antenna input signal received from an RF back-end;

generating, by a true time delay (TTD) array, a plurality of optical distribution signals for distributing the optical modulation signal to a plurality of TTD circuits for a plurality of channels, respectively;

generating, by the TTD array, a plurality of output optical signals obtained by delaying the plurality of optical distribution signals in real time by a time delay required for each channel, based on an electrical control signal;

converting, by a plurality of O/E converters, the plurality of output optical signals into RF antenna output signals, respectively; and radiating, by a plurality of antennas, the RF antenna output signals to an outside of the optical beamforming device, wherein the TTD array discretely determines a degree of the time delay according to Equation 1 below for the plurality of channels, $t_n = k(n-1)\Delta\tau$ (Equation 1) where 'n' is a continuous order of an individual channel; $t_n$ is a delay time of channel n; 'k' is an integer greater than or equal to 0 as a state value according to a phase front rotation angle of the plurality of RF antenna output signals; and $\Delta\tau$ is a unit delay time, wherein the TTD array includes:

a plurality of TTD circuits configured to generate the plurality of output optical signals obtained by forming time delays for the plurality of channels based on the plurality of optical distribution signals, respectively; and a power splitter configured to generate the plurality of optical distribution signals for the plurality of channels when the optical modulation signal is input, wherein each of the plurality of TTD circuits includes a plurality of unit cells, and wherein each of the unit cells includes:

an optical switch configured to switch to a first node connected to a first path when the electrical control signal does not indicate a time delay and to switch to a second node connected to a second path longer than the first path when the electrical control signal indicates the time delay; and an optical combiner configured to connect the first path and the second path.

* * * * *